United States Patent
Jacobs et al.

(10) Patent No.: US 7,487,105 B2
(45) Date of Patent: Feb. 3, 2009

(54) ASSIGNING CUSTOMER ORDERS TO SCHEDULE OPENINGS UTILIZING OVERLAPPING TIME WINDOWS

(75) Inventors: Simon Jacobs, Vancouver (CA); Guy Druce, Richmond (CA)

(73) Assignee: MDSI Software SRL, St. Michael (BB)

( * ) Notice: Subject to any disclaimer, the term of this patent is extended or adjusted under 35 U.S.C. 154(b) by 593 days.

(21) Appl. No.: 09/824,853

(22) Filed: Apr. 2, 2001

(65) Prior Publication Data

US 2001/0047288 A1 Nov. 29, 2001

Related U.S. Application Data

(60) Provisional application No. 60/193,834, filed on Mar. 31, 2000, provisional application No. 60/193,917, filed on Mar. 31, 2000, provisional application No. 60/193,832, filed on Mar. 31, 2000, provisional application No. 60/193,705, filed on Mar. 31, 2000, provisional application No. 60/193,833, filed on Mar. 31, 2000.

(51) Int. Cl.
*G05B 19/418* (2006.01)
(52) U.S. Cl. ........................................ 705/8
(58) Field of Classification Search .............. 705/8, 705/9
See application file for complete search history.

(56) References Cited

U.S. PATENT DOCUMENTS

| | | | | |
|---|---|---|---|---|
| 4,831,552 A | * | 5/1989 | Scully et al. | 715/751 |
| 4,937,743 A | | 6/1990 | Rassman et al. | 364/401 |
| 5,093,794 A | | 3/1992 | Howie et al. | 364/468 |
| 5,113,380 A | * | 5/1992 | Levine | 368/10 |
| 5,168,451 A | | 12/1992 | Bolger | 364/436 |
| 5,289,368 A | | 2/1994 | Jordan et al. | 364/401 |
| 5,289,531 A | * | 2/1994 | Levine | 379/93.23 |
| 5,303,145 A | * | 4/1994 | Griffin et al. | 705/9 |
| 5,325,292 A | | 6/1994 | Crockett | 364/401 |
| 5,355,368 A | * | 10/1994 | Dore et al. | 370/296 |

(Continued)

FOREIGN PATENT DOCUMENTS

DE 195 39 662 C2 10/1997

(Continued)

OTHER PUBLICATIONS

Padwick, Gordon et al., Special Edition Using Microsoft Outlook 2000 Que, May 1999, ISBN: 0-7897-1909-6, Chapters 10-11.*

(Continued)

*Primary Examiner*—Scott L. Jarrett
(74) *Attorney, Agent, or Firm*—Dorsey & Whitney LLP (57) ABSTRACT

Methods for providing an enhanced scheduling process are discussed. One embodiment of the present invention includes a method for assigning an order to an opening in a schedule after a customer has selected an appointment window in the schedule. The opening and the appointment window are specified. The method includes generating a list of schedulable time blocks for a shift identified in the opening, intersecting the opening and the appointment window to obtain a time range, and choosing the opening in which to assign the order if a schedulable time block from the list of schedulable time blocks includes the opening. The opening is within the time range obtained by the act of intersecting.

2 Claims, 4 Drawing Sheets

U.S. PATENT DOCUMENTS

| | | | |
|---|---|---|---|
| 5,355,511 A | 10/1994 | Hatano et al. | 455/11.1 |
| 5,428,546 A | 6/1995 | Shah et al. | 364/449 |
| 5,467,268 A | 11/1995 | Sisley et al. | 364/401 |
| 5,524,077 A | 6/1996 | Faaland et al. | 364/402 |
| 5,532,702 A | 7/1996 | Mintz | 342/463 |
| 5,590,269 A | 12/1996 | Kruse et al. | 395/209 |
| 5,615,121 A * | 3/1997 | Babayev et al. | 705/9 |
| 5,623,404 A * | 4/1997 | Collins et al. | 705/9 |
| 5,636,122 A | 6/1997 | Shah et al. | 364/449.1 |
| 5,655,118 A | 8/1997 | Heindel et al. | 395/614 |
| 5,737,728 A | 4/1998 | Sisley et al. | 705/8 |
| 5,758,313 A | 5/1998 | Shah et al. | 701/208 |
| 5,764,953 A | 6/1998 | Collins et al. | 395/500 |
| 5,774,661 A | 6/1998 | Chatterjee et al. | 395/200.33 |
| 5,774,867 A * | 6/1998 | Fitzpatrick et al. | 705/8 |
| 5,826,239 A | 10/1998 | Du et al. | 705/8 |
| 5,848,395 A * | 12/1998 | Edgar et al. | 705/9 |
| 5,860,067 A * | 1/1999 | Onda et al. | 705/9 |
| 5,870,545 A | 2/1999 | Davis et al. | 395/200.31 |
| 5,893,906 A | 4/1999 | Daffin et al. | 705/28 |
| 5,904,727 A | 5/1999 | Prabhakaran | 701/208 |
| 5,913,201 A | 6/1999 | Kocur | 705/9 |
| 5,920,846 A | 7/1999 | Storch et al. | 705/7 |
| 5,922,040 A | 7/1999 | Prabhakaran | 701/117 |
| 5,963,913 A * | 10/1999 | Henneuse et al. | 705/9 |
| 5,970,466 A * | 10/1999 | Detjen et al. | 705/8 |
| 6,016,477 A | 1/2000 | Ehnebuske et al. | 705/7 |
| 6,047,260 A * | 4/2000 | Levinson | 705/9 |
| 6,070,144 A | 5/2000 | Ginsberg et al. | 705/9 |
| 6,088,626 A * | 7/2000 | Lilly et al. | 700/100 |
| 6,092,048 A | 7/2000 | Nakaoka | 705/9 |
| 6,115,640 A | 9/2000 | Tarumi | 700/99 |
| 6,144,971 A | 11/2000 | Sunderman et al. | 707/500 |
| 6,219,412 B1 * | 4/2001 | Wellner et al. | 379/202.01 |
| 6,278,978 B1 | 8/2001 | Andre et al. | 705/9 |
| 6,415,259 B1 | 7/2002 | Wolfinger et al. | 705/8 |
| 6,430,562 B1 | 8/2002 | Kardos et al. | 707/10 |
| 6,473,748 B1 | 10/2002 | Archer | 706/45 |
| 6,484,036 B1 * | 11/2002 | Sorkin et al. | 455/508 |
| 6,532,465 B2 | 3/2003 | Hartley et al. | 707/10 |
| 6,535,883 B1 | 3/2003 | Lee et al. | 707/100 |
| 6,546,364 B1 | 4/2003 | Smirnov et al. | 703/22 |
| 6,546,425 B1 | 4/2003 | Hanson et al. | 709/227 |
| 6,578,005 B1 * | 6/2003 | Lesaint et al. | 705/8 |
| 6,633,900 B1 | 10/2003 | Khalessi et al. | 709/202 |
| 6,697,784 B2 | 2/2004 | Bacon et al. | 705/9 |
| 6,701,299 B2 * | 3/2004 | Kraisser et al. | 705/8 |
| 6,721,288 B1 | 4/2004 | King et al. | 370/310 |
| 6,745,381 B1 | 6/2004 | Ehnebuske et al. | 717/100 |
| 6,754,321 B1 | 6/2004 | Innes et al. | 379/201.03 |
| 6,823,315 B1 * | 11/2004 | Bucci et al. | 705/9 |
| 6,850,895 B2 | 2/2005 | Brodersen et al. | 705/9 |
| 7,127,412 B2 * | 10/2006 | Powell et al. | 705/9 |
| 7,343,316 B2 * | 3/2008 | Goto et al. | 705/9 |
| 2001/0029499 A1 | 10/2001 | Tuatini et al. | 706/47 |
| 2001/0037229 A1 | 11/2001 | Jacobs et al. | 705/8 |
| 2001/0047287 A1 | 11/2001 | Jacobs et al. | 705/9 |
| 2001/0049619 A1 * | 12/2001 | Powell et al. | 705/9 |
| 2002/0007299 A1 * | 1/2002 | Florence | 705/9 |
| 2002/0010610 A1 | 1/2002 | Jacobs et al. | 705/8 |
| 2002/0010615 A1 | 1/2002 | Jacobs | 705/9 |
| 2002/0016645 A1 | 2/2002 | Jacobs et al. | 700/100 |
| 2002/0023157 A1 | 2/2002 | Lo et al. | 709/227 |
| 2002/0035493 A1 * | 3/2002 | Mozayeny et al. | 705/5 |
| 2002/0046073 A1 * | 4/2002 | Indseth et al. | 705/8 |
| 2002/0065700 A1 | 5/2002 | Powell et al. | 705/9 |
| 2002/0199182 A1 | 12/2002 | Whitehead | 725/1 |
| 2005/0027580 A1 * | 2/2005 | Crici et al. | 705/8 |

FOREIGN PATENT DOCUMENTS

| | | |
|---|---|---|
| WO | WO 00/28451 A3 | 5/2000 |
| WO | WO 00/68856 * | 11/2000 |
| WO | WO 00/68859 * | 11/2000 |

OTHER PUBLICATIONS

Scheduling Software Helps Webban Meet 30-Minute Delivery Windoe Stores Magazine, Jul. 2000.*

Solomon, Marius M., Alogrithms for the Vehicle Routing and Scheduling Problems with Time Window Constraints Operations research, Mar.- Apr. 1987, vol. 35, No. 2, pp. 254-265.*

Domenjoud, Eric et al., Genearting feasible schedules for a pick-up and delivery problem Proceedings of CP-1998, Technical Report 97-R-142, Apr. 1998.*

Mitrovic-Minic, Snezana, Pickup and Delivery Problem with Time Windows: A Survey May 1998.*

Dumas, Yvan et al., The Pickup and Delivery Problem with Time Windows European Journal of Operations Research, Sep. 1991, vol. 54, No. 1, Abstract.*

Nanry, William et al., Solving the pickup and delivery problem with time windows using reactive tabu search Transportation Research, Part B, vol. 34, 2000.*

Vantive and MDSI to Provide Enterprise-Wide Wireless Field Service PR Newswire, Oct. 26, 1998.*

DiCarlo, Lisa, Connectria: E-scheduling is next big thing eWeek, Mar. 20, 2000.*

Descartes.com Web Pages Mar. 20, 2000.*

MDSI-Advantex.com Web Pages Dec. 1998, Retrieved from Archive.org Apr. 4, 2006.*

Witt, Clyde, Update: Material Handling in the Food Industry Material Handling Engineering, vol. 54, No. 11, Oct. 1999.*

Sciacca, Patrick, Webvan Gets E-Business Software for Expansion Jan. 31, 2000, Supermarket News.*

Solomon, Marius M., Algorithms for The Vehicle Routing Schduling Problems with Time Window Constraints Operations Research, vol. 35, No. 2, Mar.-Apr. 1987, pp. 254-265.*

Ferland Jacques A. et al., Vehicles scheduling with sliding time windows European Journal of Operational Research, vol. 38, No. 25, Jan. 1998, Abstract.*

Jones, Stuart, Heuristics to Schedule Service Engineers Within Time Windows Journal of the Operational Research Society, vol. 46, 1995, pp. 339-346.*

Balakrishnan, Nagraj, Simple Heuristics for the Vehicle Routeing Problem with Soft Time Windows The Journal of the Operational Research Society, vol. 44, No. 3, Mar. 1993, pp. 279-287.*

Smith, Stephen, Reactive Scheduling System Brown D. et al., Intelligent Systems, 1994.*

Liu, Fuh-Hwa Franklin et al., A route-neighborhod-based metahueristic for vehicle routing problem with time windows European Journal of Operational Research, vol. 18, 1999, pp. 485-504.*

Larsen, Allan, The Dynamic Vehicle Routing Problem Lyngby, Jun. 2000.*

PrimeTime F&S User's Guide Version 1.3 Blue Pumpkin Software, Inc. 1998.*

User's Guide to Roadnet 5000—Routing & Scheduling Systems Version 5.6 Roadnet Technologies, Inc., 1996.*

Visual Staff Scheduler Pro Version 3.0 User Guide Atlas Business Solutions, Inc., 1997.*

Adhikari, R., "Scheduling Solutions", Information Week, www.informationweek.com, Apr. 1998. 7 pages.

Alanko T. et al., "Mowgli: Improvements for Internet Applications Using Slow Wireless Links", The 8th IEEE International Symposium on Personal, Indoor and Mobile Radio Communications, vol. 3, 1997. pp. 1038-1042.

ClickSchedule, Products, Click Schedule Tour and Article Web pages, ClickService Software, Inc., www.clickservice.com/products, 2000 (retrieved Feb. 2005). 12 pages.

Gunes, E.D., "Workforce Scheduling", Department of Industrial Engineering Bilkent University, Apr. 1999. 1-11.

ILOG.com, "ILOG Dispatcher Field Service Dispatcher", ILOG Worldwide (retrieved from archive.org), Dec. 2000 (retrieved Feb. 2005). 2 pages.

ILOG.com, ILOG World Leader in software components, Business Rules, Rule Engine, Rule Language, Rule Kit, Constraint Base Scheduling, ILOG Dispatcher Web pages, www.ilog.com/products/rules, 2000 (retrieved Feb. 2005). 21 pages.

Keller, A. et al., "Zippering: Managing intermittent connectivity in DIANA", Mobile Networks and Application, Baltzer Science Publishers BV, Netherlands, vol. 2, No. 4, 1997. pp. 357-364.

Kleinrock, L., "Nomadicity: Anytime, anywhere in a disconnected world", Mobile Networks and Applications, Journal of Special Topics in Mobile Networks and Applications, J.C. Baltzer AG, Science Publishers, Netherlands, vol. 1, No. 4, pp. 351-357.

LaPorta T.F. et al., "Challenges for nomadic computing: Mobility management and wireless communications", Mobile Networks and Applications, Journal of Special Topics in Mobile Networks and Applications, J.C. Baltzer AG, Science Publishers, Netherlands, vol. 1, No. 1, Aug. 1996. pp. 3-16.

Livneh, E., "Case Study: Automating Service Allocation and Scheduling", Association for Services Management International, www.afsmi.org, May 1997. pp. 1-5.

Marshak, R.T, "ClickSchedule: Completing the Online Buying Experience", ClickSoftware, Patrica Seybold Group, Oct. 1999. pp. 1-13.

Mazer, M.S. et al., "Writing the Web While Disconnected", IEEE Personal Communications, vol. 5, No. 5, Oct. 1998. pp. 35-41.

MDSI Mobile Data Solutions, www.mdsi-advantex.com (retrieved from google.com and archive.org). Feb. 1998 (retrieved Apr. 2005). pp. 1-31.

Mummert L. et al., "Exploiting Weak Connectivity for Mobile File Access", Fifteenth AC Symposium on Operating Systems Principles, Colorado, vol. 29, No. 5, Dec. 1995. pp. 143-155.

Open Wave—Home and Shift Track Web pages, www.open-wave.com (retrieved from archive.org), Open Wave, Inc., 1999. 5 pages.

Blumberg, D., "Optimizing Mobile Workforce", Leisure Publications, Feb. 1, 2001.

Aytug, H. et al., "A Review of Machine Learning in Scheduling", IEEE Transactions on Engineering Management, vol. 41, No. 2, May 1994. pp. 165-171.

"Connectria Unveils ServiceClick to Enable the Next Wave of E-Commerce—'E-Scheduling' of Services, Appointments & Reservations", Business Wire, New York, Jan. 4, 2000. Two pages.

De Serres, Y., "Simultaneous optimization of flow control and scheduling in queues", McGill University, Publication No. AAT NN72160, 1991. Abstract only, one page.

Marinho J. et al., "Decision Support System for Dynamic Production Scheduling", IEEE International Symposium on Assembly and Task Planning, Jul. 1999. pp. 424-429.

Martin, J., "Principles of Object-Oriented Analysis and Design", PTR Prentice Hall, New Jersey, 1993. pp. vii-xiii and 133-154.

McFeely, D.J. et al., "Scheduling to Achieve Multiple Criteria in an Air Force Depot CNC Machine Shop", Production and Inventory Management Journal, vol. 38, No. 1, First Quarter 1997. 72-79.

"MenuHunter.com to Provide the Ultimate in Online Restaurant Reservations Using ServeClick from Connectria; Service to Handle Complex, Real-World Needs of Restaurants & Patrons", Business Wire, New York, Feb. 1, 2000. Three pages.

Panwalker, S.S. et al., "A Survey of Scheduling Rules", Operations Research, vol. 25, No. 1, Jan.-Feb. 1977. pp. 45-61.

Pierreval, H. et al., "Dynamic Selection of Dispatching Rules for Manufacturing System Scheduling", International Journal Production Research, vol. 35, No. 6, 1997. pp. 1575-1591.

"RestaurantRow.com Selects ServeClick from Connectria to Power its Advanced Online Restaurant E-Scheduling", PR Newswire, New York, Feb. 1, 2000. Three pages.

"SERVECLICK", U.S. Trademark Application 75914207, Applicant: Catalyst Solutions Group, Inc., filed Feb. 9, 2000, abandoned Feb. 17, 2001. One page.

"ServeClick.com" Web pages retrieved from archive.org on Apr. 2006, ServeClick, 1999-2000. pp. 1-13.

Tkach, D. et al., "Visual Modeling Technique Object Technology using Visual Programming", Addison-Wesley, 1996. pp. 324-336.

Bisio, R. et al., "Effective Resource Scheduling in Work Force Management Context for Telecommunication Work Centers", Torino, Italy, CPAIOR, 1999. Five pages.

Collins, J.E. et al., "Autotmated Assignment and Scheduling of Service Personnel", IEEE Expert, Apr. 1994. pp. 33-39.

Guido, B. et al., "Work Force Management (WFM) Issues", Network Operations and Management Systems, IEEE 1998. pp. 473-482.

Jing, J. et al., "WHAM: Supporting Mobile Workforce and Applications in Workflow Environments", Research Issues in Data Engineering, RIDE 2000, February 2000. Eight pages.

Lesaint, D. et al., "Dynamic Workforce Management", The Institution of Electrical Engineers, IEE Colloquium on AI for Network Management Systems, 1997. pp. 1-5.

Lesaint, D. et al., "Dynamic Workforce Scheduling for British Telecommunications plc", Interfaces, vol. 30, No. 1, Jan.-Feb. 2000. pp. 45-52.

\* cited by examiner

ASSIGNING CUSTOMER ORDERS TO SCHEDULE OPENINGS UTILIZING OVERLAPPING TIME WINDOWS

CROSS-REFERENCES TO RELATED APPLICATION

This application incorporates by reference and claims the benefit of U.S. Provisional Application No. 60/193,834 filed Mar. 31, 2000; U.S. Provisional Application No. 60/193,917, filed Mar. 31, 2000; U.S. Provisional Application No. 60/193,832, filed Mar. 31, 2000; U.S. Provisional Application No. 60/193,705, filed Mar. 31, 2000; and U.S. Provisional Application No. 60/193,833, filed Mar. 31, 2000.

TECHNICAL FIELD

The technical field relates generally to scheduling. More particularly, it pertains to assigning an order to an opening in the schedule within a predetermined period of time.

COPYRIGHT NOTICE-PERMISSION

A portion of the disclosure of this patent document contains materials which are subject to copyright protection. The copyright owner has no objection to the facsimile reproduction by anyone of the patent document or the patent disclosure as it appears in the Patent and Trademark Office patent files or records, but otherwise reserves all copyright rights whatsoever. The following notice applies to the software and data as described below and in the drawings attached hereto: Copyright© 2001, MDSI Mobile Data Solutions Inc., All Rights Reserved.

BACKGROUND OF THE INVENTION

Suppose that to schedule a desired service to be performed, a customer calls a service organization to place an order for the desired service. The customer may be kept on the phone for an undesirably long period of time while the service organization searches the schedule in an attempt to fit the order into the schedule. To avoid annoying the customer, some service organizations do not search the schedule while the customer is on the phone, but simply accept the order and dump it into a time bucket without scheduling the order to a particular shift of a worker. The night before the order is to be performed, the service organization executes a batch process that assigns orders to various workers.

The approach as described above limits the ability of a customer to specify his preferences in regard to when and how the order is to be performed. The customer is unable to select a desired appointment window or a desired worker with a set of desired skills. As the expectations of customers have increased over time, scheduling systems that fail to meet increased customer expectations may result in customer dissatisfaction and lead to the eventual lack of acceptance in the marketplace. Thus, what is needed are systems and methods for enhancing the scheduling process that allow customers' increased expectations to be met.

SUMMARY OF THE INVENTION

An illustrative aspect of the invention includes a method for assigning an order to an opening in a schedule after a customer has selected an appointment window in the schedule. The opening and the appointment window are specified. The method includes generating a list of schedulable time blocks for a shift identified in the opening; intersecting the opening and the appointment window to obtain a time range; and choosing the opening to assign the order if a schedulable time block from the list of schedulable time blocks includes the opening, and wherein the opening is within the time range obtained by the act of intersecting.

Another illustrative aspect of the invention includes a method for assigning an order to a schedule after a customer has specified an appointment window in the schedule. The method includes checking a list of openings for overlap with the appointment window; generating a list of schedulable time blocks in a shift if there is no overlap; and assigning the order to the schedule if there is an opening in the list of openings that overlaps with the appointment window or an opening in the list of schedulable time blocks that overlaps with the appointment window.

DETAILED DESCRIPTION OF THE INVENTION

In the following detailed description of exemplary embodiments of the invention, reference is made to the accompanying drawings, which form a part hereof, and in which are shown, by way of illustration, specific exemplary embodiments in which the invention may be practiced. In the drawings, like numerals describe substantially similar components throughout the several views. These embodiments are described in sufficient detail to enable those skilled in the art to practice the invention. Other embodiments may be utilized and structural, logical, electrical, and other changes may be made without departing from the spirit or scope of the present invention. The following detailed description is, therefore, not to be taken in a limiting sense, and the scope of the present invention is defined only by the appended claims.

Figure 1:
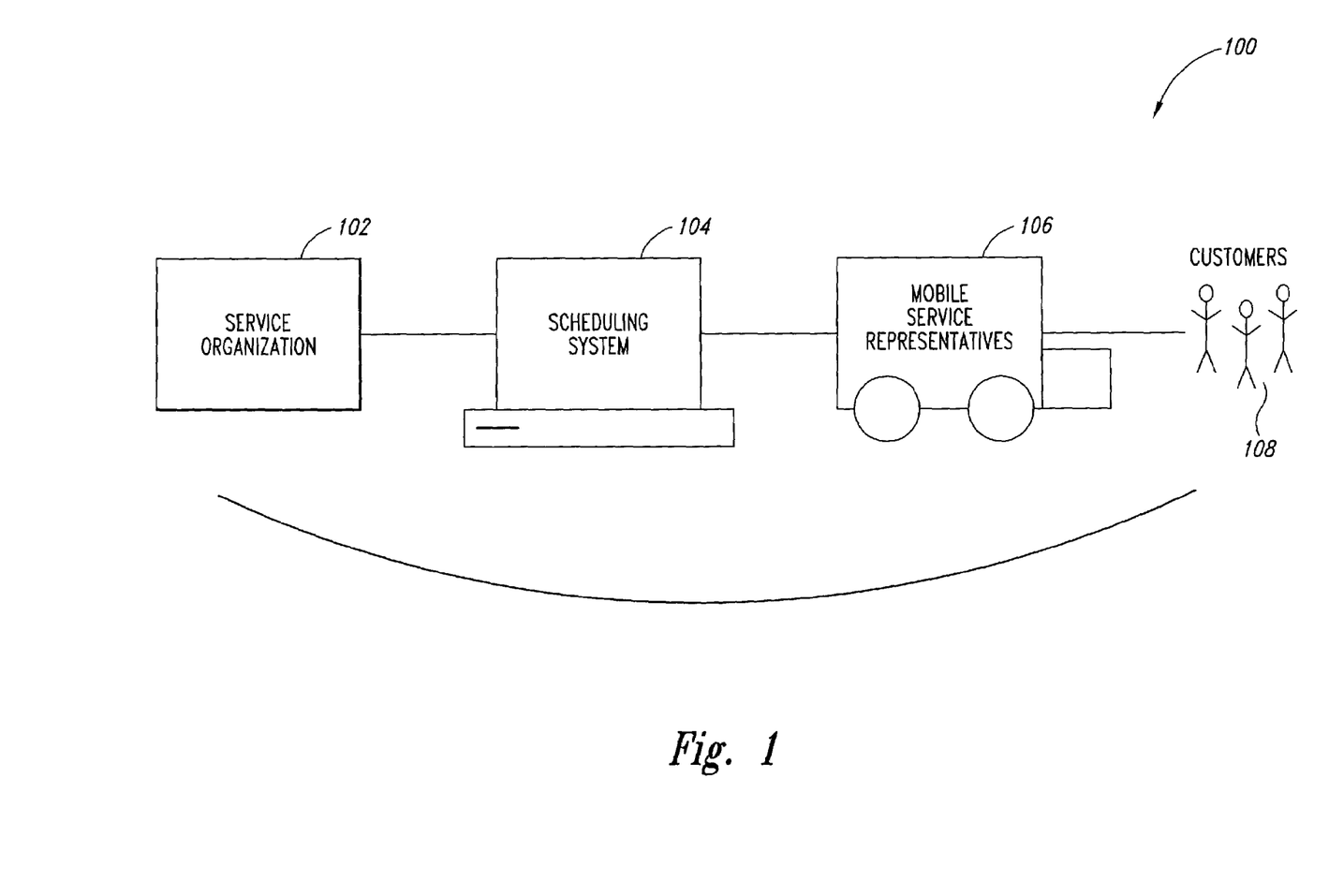
FIG. 1 is a block diagram of a system showing the relationship between a service organization, a scheduling system, mobile service representatives, and customers according to one embodiment of the present invention.

FIG. 1 is a block diagram of a system 100 according to one embodiment of the present invention. The system 100 includes a service organization 102. The service organization 102 performs services for a roster of customers 108. When a customer 108 is interested in having a service performed by the service organization 102, the customer 108 calls the service organization 102 to make a reservation for the service performed.

Using the scheduling system 104, the service organization 102 negotiates with the customer 108 to place a reservation in a schedule. The scheduling system 104 provides to the service organization 102 several appointment windows from which the customer 108 may choose. The customer 108 selects an appointment window in which the service requested will be performed.

During the negotiation, the scheduling system 104 determines which mobile service providers 106 can do the work. A mobile service provider 106 is one who is capable of performing the service requested by the customer 108. Each time a reservation is placed, the scheduling system 104 accounts for many factors in assigning the reservation to a mobile service provider 106, such as time availability, skill sets, geographic area, duration of each job, travel times between jobs, and equipment requirements. As customers 108 place more reservations for services, the scheduling system 104 periodically optimizes the schedule by relocating reservations assigned to a single mobile service representative or swapping reservations between different mobile service representatives.

The scheduling system 104 can be implemented over one machine or several machines with different processors. This allows the scheduling system 104 to be scalable depending on the needs of the service organization 102. The scheduling system 104 is also configurable. This allows the scheduling system 104 to meet different constraints and objectives. In one embodiment, the scheduling system 104 is implemented over Common Object Request Broker Architecture (CORBA). In another embodiment, the scheduling system 104 is implemented using a database, such as an Oracle database.

Figure 2:
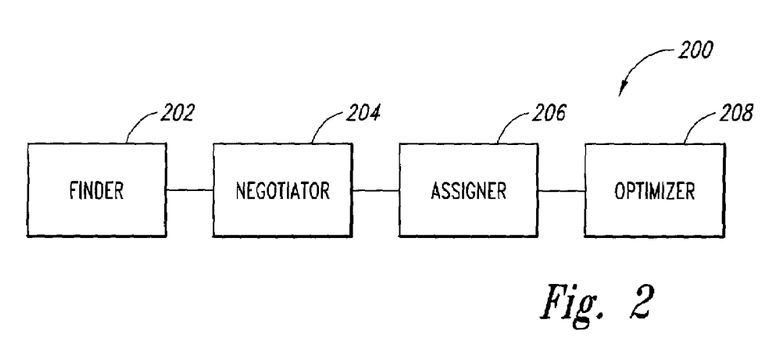
FIG. 2 is a block diagram of a scheduling system according to one embodiment of the present invention.

FIG. 2 is a block diagram of a scheduling system 200 according to one embodiment of the present invention. The scheduling system 200 is similar to the scheduling system 104 of FIG. 1. The scheduling system 200 includes a finder 202. When a customer calls the service organization to place an order for service, the finder 202 finds one or more openings in the schedule in which the order may fit. Recall that prior systems may take a prohibitively long period of time to find openings in the schedule. In contrast, the embodiments of the present invention through the implementation of the finder 202 return one or more openings within an amount of time so that the customer need not wait on the phone for an undesirably long period of time.

After the finder 202 finds one or more openings, the negotiator 204 may present these openings as appointment windows to the service organization. The service organization can discuss these appointment windows with the customer and negotiate with the customer to select an appointment window to perform the service in accordance with the order. The customer may make specific demands, such as a request for a particular worker to perform the service or a request for a particular set of skills in the performance of the service. The finder 202 can find openings in the schedule associated with a particular worker.

When the customer has selected an appointment window, the assigner 206 proceeds to assign the order to the opening associated with the appointment window. When the order is assigned, the optimizer 208 optimizes the schedule so as to accommodate additional orders. In one embodiment, the optimizer 208 defragments the available spaces in a shift to fit additional orders in the shift.

Figure 3:
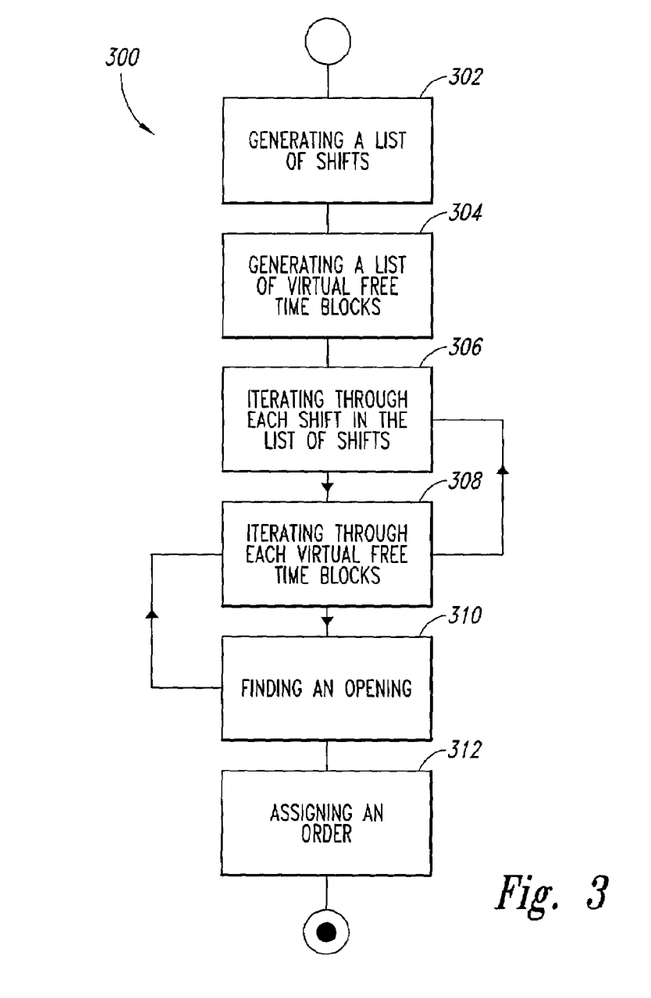
FIG. 3 is a process diagram of a method for finding an opening in a schedule to fit an order to a shift of a worker and assigning the order to the opening according to one embodiment of the present invention.

FIG. 3 is a process diagram of a method 300 for finding an opening in a schedule to fit an order to a shift of a worker according to one embodiment of the present invention. The method 300 begins with an act 302 for generating a list of shifts. The act 302 generates a list of shifts into which an order might fit. Each shift in the list of shifts may contain enough time to accommodate the order. The act 302 also includes a set of candidacy rules and a temporal constraint that allow the act to be more selective about each shift in the list of shifts.

The method 300 includes an act 304 for generating a list of virtual free time blocks. The list of virtual free time blocks is generated for a shift of a worker. A virtual free time block is an amount of time that could be used to fit an order by either bumping one or more contiguous order within a shift or by a free time block. The term "free time block" means a block of free time between the end of the work on one order and the start of travel to another order. Thus, by bumping one or more contiguous orders within a shift, a virtual free time block may accumulate enough free time to fit an order into the shift. The term "contiguous" means next to or near in time or sequence.

The method 300 includes an act 306 for iterating through each shift in the list of shifts generated in the act 302. The act 306 allows a set of acts to execute for each shift in the list of shifts. This set of acts helps to find one or more openings in the list of shifts so as to fit an order into the schedule for a customer. This set of acts is described in greater detail hereinbelow.

The method 300 includes an act 308 for iterating through each virtual free time block from a list of virtual free time blocks for each shift. The list of virtual free time blocks is generated from the act 304 for each shift in the list of shifts generated in the act 302. In one embodiment, each virtual free time block is a free time block. Another abstraction of the free time block called a schedulable time block keeps track of the virtual free time blocks that can be gathered to fit an order into a shift. The schedulable time block is discussed in greater detail hereinbelow.

The act 308 allows a set of acts to execute for each virtual free time block in the list of virtual free time blocks for each shift. This set of acts help to identify whether the virtual free time block is a candidate to become an opening in the shift so as to fit an order. The combination of act 306 and act 308 searches through the list of shifts and the virtual free time blocks in the list of shifts for one or more openings to fit an order.

The method 300 includes an act 310 for finding an opening. The act 310 comprises other acts that are executed to find one or more openings to fit an order. The act 310 is iterated by the act 308 for each virtual free time block in the list of virtual free time blocks and by the act 306 for each shift in the list of shifts.

The method 300 also includes an act 312 for assigning an order. When one or more openings are found, these openings are presented to a customer. The customer selects a desired opening. The act 312 attempts to assign the order to the opening. If the order is successfully assigned to the opening, the order is assigned to a shift of a worker. On the appointed date and time, the worker proceeds to perform the service as specified in the order.

Figure 4:
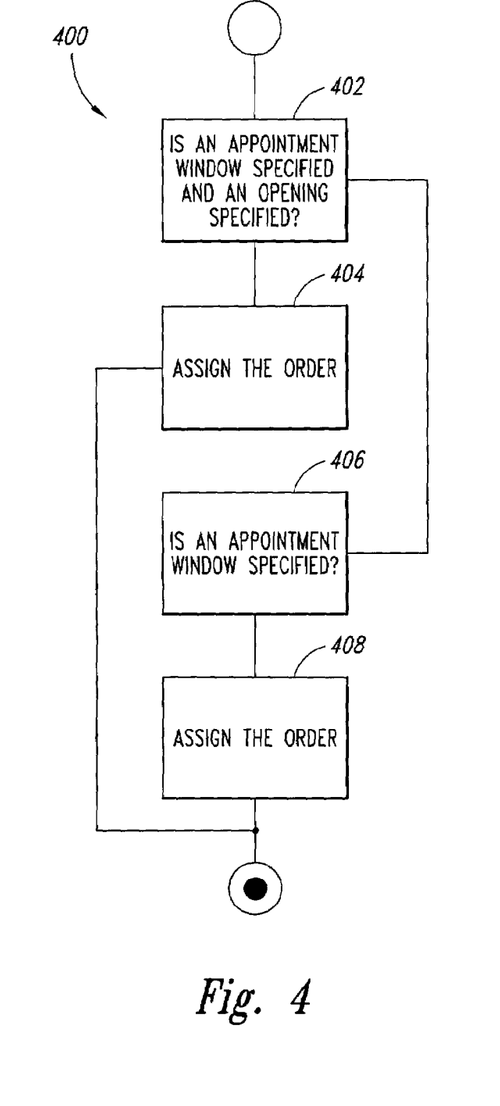
FIG. 4 is a process diagram of a method for determining the type of information that is available in order to assign an order to an opening in a schedule according to one embodiment of the present invention.

FIG. 4 is a process diagram of a method 400 for determining the type of information that is available in order to assign an order to an opening in a schedule according to one embodiment of the present invention. The method 400 discusses the act 312 of FIG. 3 in greater detail.

The method 400 begins at an act 402. The act 402 verifies whether an appointment window has been specified and whether an opening has been specified. If both of these are specified and the customer wishes to commit the order to the opening, the method 400 progresses to an act 404. Otherwise, the method 400 progresses to an act 406.

Figure 5:
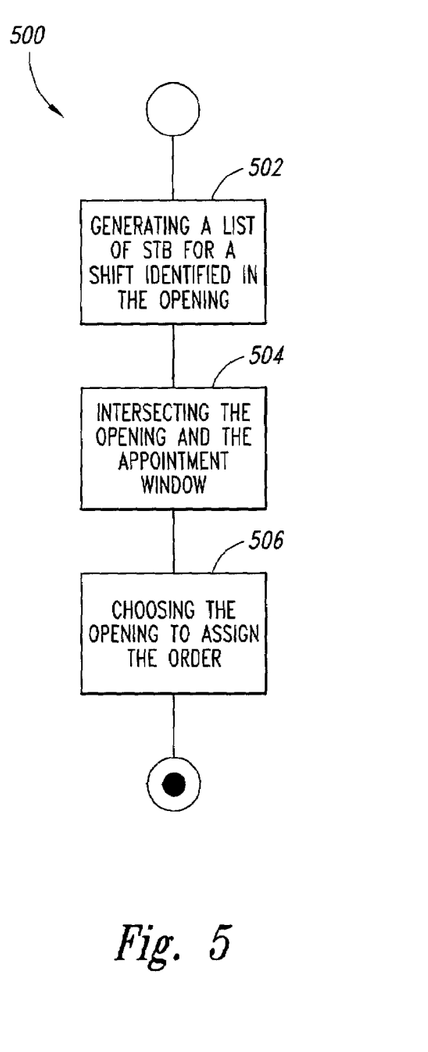
FIG. 5 is a process diagram of a method for assigning an order to an opening in a shift where both the appointment window and the opening are specified according to one embodiment of the present invention.

The act 404 assigns the order to the opening if both the appointment window and the opening are specified. The discussion proceeds to FIG. 5 so as to explain the act 404 in greater detail. FIG. 5 is a process diagram of a method 500 for assigning an order to an opening in a shift where both the appointment window and the opening are specified according to one embodiment of the present invention. The method 500 begins at an act 502.

The act 502 generates a list of schedulable time blocks that could be used for the order. Each schedulable time block is derived from the shift into which the order is to be assigned. A schedulable time block is a range of time comprising any combination of free time blocks or any combination of free time blocks and virtual free time blocks. The method 500 then progresses to an act 504.

The act 504 intersects the opening and the appointment window to obtain an intersection. The intersection defines a time range. If there is no intersection, then there has been an error, and the method 500 terminates its execution. Otherwise, the method 500 proceeds to an act 506.

The act 506 finds a schedulable time block in the list of schedulable time blocks that includes an opening that falls within the time range computed in the act 504. The opening found by the act 506 is then chosen for assigning the order. If no opening can be found in the list of schedulable time blocks, then the desired opening has already been used up by the scheduling system, and the method 500 terminates its execution.

Returning to the method 400, the method 400 progresses to the act 406. The act 406 is executed when the appointment window is specified but not the opening. If the appointment window is specified and the customer wishes to commit the order to an unspecified opening, the method 400 progresses to an act 408. Otherwise, the method 400 terminates its execution.

Figure 6:
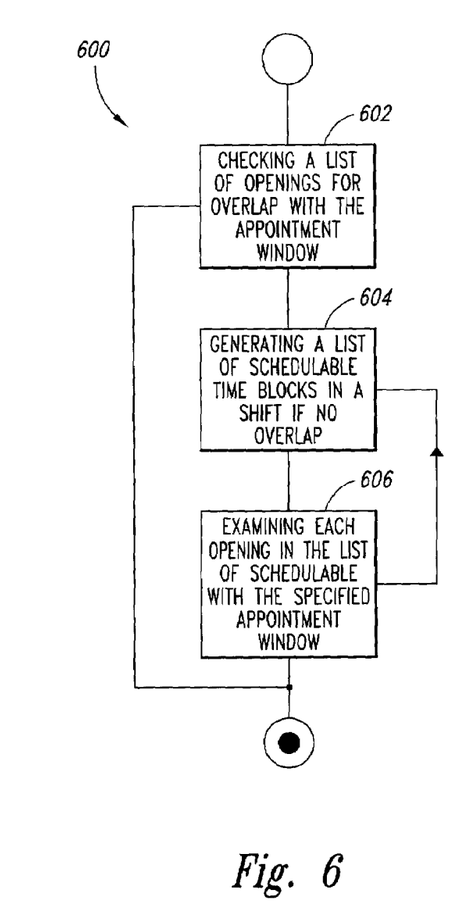
FIG. 6 is a process diagram of a method for assigning an order to an opening in a shift where the appointment window is specified according to one embodiment of the present invention.

The act 408 assigns the order to an opening if the appointment window is specified and the opening is not be specified. The discussion proceeds to FIG. 6 so as to explain the act 408 in greater detail. FIG. 6 is a process diagram of a method 600 for assigning an order to an opening in a shift where the appointment window is specified according to one embodiment of the present invention. The method 600 begins at an act 602.

The act 602 verifies that a list of openings is available. If the list is available, the act 602 checks each opening for overlap with the appointment window. If there is an overlap, then the opening may be a candidate to fit the order, and the method 600 terminates. Otherwise, the method 600 progresses to an act 604.

The act 604 generates a list of schedulable time blocks on a shift-by-shift basis. Each schedulable time block may contain an opening that overlaps with the appointment window that was specified. An act 606, which follows the act 604, examines each opening in the list of schedulable time blocks for overlapping with the appointment window. If an opening is found that overlaps with the appointment window, then the order is assigned to the opening, and the method 600 terminates its execution. Otherwise, if an opening cannot be found, the act 606 loops back to the act 604 to generate another list of schedulable time blocks for another shift, so that an appropriate opening can be found.

Figure 7:
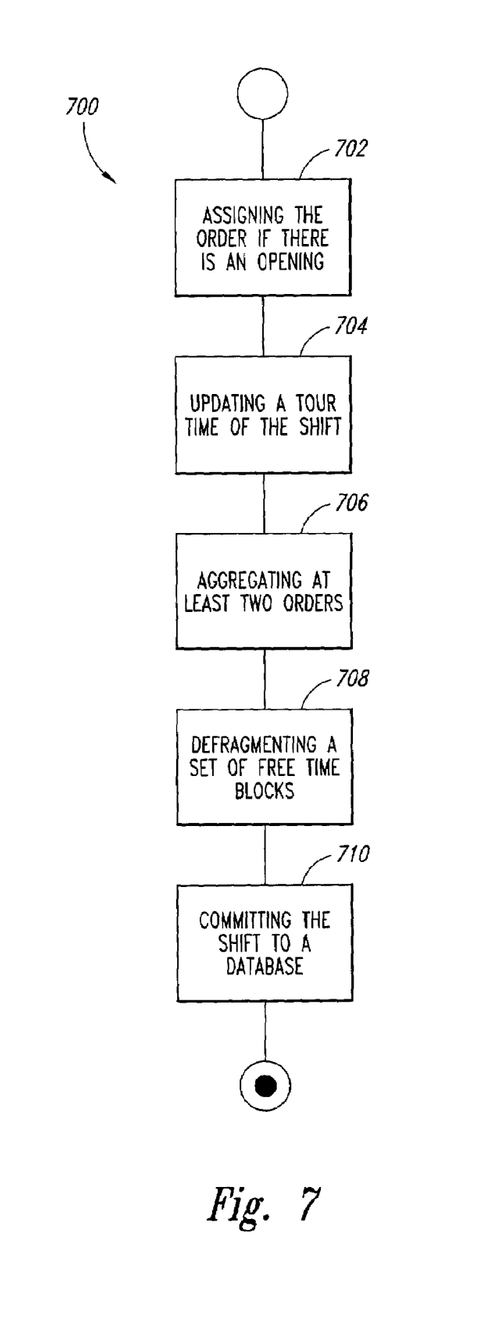
FIG. 7 is a process diagram of a method for assigning an order after an opening in a schedule has been found according to one embodiment of the present invention.

FIG. 7 is a process diagram of a method 700 for assigning an order after an opening in a schedule has been found according to one embodiment of the present invention. The method 700 includes an act 702. The act 702 assigns the order to the opening in the schedule. The act 702 follows the termination of the execution of either the method 500 of FIG. 5 or the method 600 of FIG. 6 if the method 500 or the method 600 produces an opening appropriate for fitting an order. The act 702 inserts the order into the opening with the confidence that the opening has sufficient time to fit the order.

In one embodiment, the schedulable time block from which the opening is derived may contain more time than is required to fit the order. The act 702 enhances the schedulable time block so that there is an appropriate fitting given the size of the opening. The act 702 may consider reinserting other assigned orders that were bumped to make room for the unassigned order.

The method 700 progresses to an act 704. The act 704 updates a tour time of the shift containing the order. The act 704 increments the tour time of the shift by the time required to travel to the order along with the time needed to travel to the next order. The act 704 may also update the load level of the shift to reflect the order. The load level of the shift denotes the percentage of the time of the shift that is dedicated to working on assigned orders. The service organization may impose a load limit on each shift. For example, a low load limit may be placed on a shift of an experienced technician so that the technician may be available for most of the day to troubleshoot emergencies.

The method 700 progresses to an act 706. The act 706 attempts to aggregate assigned orders in a shift. Aggregation is a technique used to enhance a shift of a worker. The embodiments of the present invention allow reservations that are similar in some way to be aggregated or grouped together so that they are assigned one after the other to the shift of a worker. For example, reservations that are for the same apartment building or in close proximity might be aggregated.

There are at least two uses of aggregation. When accurate travel time information does not exist, aggregation allows reservations that are in close proximity to be identified, such as by a common street address or zip code. When accurate travel time information does exist, aggregation brings together reservations that are closely related to be assigned to the same mobile service representative, preventing more than one mobile service representative from showing up in roughly the same location at the same time.

The method 700 progresses to an act 708. The act 708 defragments a set of free time blocks in the shift. A shift may contain a number of free time blocks. But each free time block may be scattered throughout the shift with very limited duration to fit unassigned orders. The act 708 defragments the free time blocks so as to create one or more usable free time blocks with greater duration so as to fit unassigned orders.

The method 700 progresses to an act 710. The act 710 commits the shift with the order fitted in the opening to a database. Any suitable databases may be used. One example of a suitable database includes an Oracle database.

CONCLUSION

What has been discussed hereinbefore is a technique for assigning an order for service to an opening in a schedule so as to allow a service organization to address the preferences of customers while allowing the service organization to satisfy constraints placed on the scheduling system and to meet business objectives. A scheduling system comprises three main components. The negotiator interacts with customers to negotiate an appointment window to perform the service specified in the reservation. The assigner assigns the reservation to a shift of a mobile service representative. And the optimizer continuously optimizes the schedule in the background. The embodiments of the present invention focus on providing one or more openings within a predetermined period of time for the negotiator to interact with customer in a timely manner. Because customers dislike waiting on the phone for an extended period of time, the embodiments of the present invention enable the negotiator to work fast enough to obtain an agreeable time window and the worker to perform the service requested.

Although the specific embodiments have been illustrated and described herein, it will be appreciated by those of ordinary skill in the art that any arrangement calculated to achieve the same purpose may be substituted for the specific embodiments shown. This application is intended to cover any adaptations or variations of the present invention. It is to be understood that the above description is intended to be illustrative, and not restrictive. Combinations of the above embodiments and other embodiments will be apparent to those of skill in the art upon reviewing the above description. The scope of the invention includes any other applications in which the above structures and fabrication methods are used. Accordingly, the scope of the invention should only be determined with reference to the appended claims, along with the full scope of equivalents to which such claims are entitled.

We claim:

1. A computer readable medium having instructions stored thereon for causing a computer to perform a method for assigning an order to a schedule, the method comprising:

the schedule having an opening identified by iterating through a list of shifts potentially having sufficient time to accommodate the order and through a list of virtual free time blocks for each shift in the list of shifts, a virtual free time block representing an amount of time in which an order may be assigned by bumping assigned orders in a shift;

where a customer has specified both an appointment window and an opening for the order, generating a list of schedulable time blocks for a shift identified in the customer specified opening, the schedulable time blocks having at least one of a free time block and a virtual free time block and defining a range of time having openings to which the order can be assigned, the openings resulting from analysis of orders already assigned in the shifts;

intersecting the customer specified opening and the appointment window to obtain a time range defined by an overlap of the customer specified opening and the appointment window; and assigning the order to a candidate opening if a schedulable time block from the list of schedulable time blocks includes at least one candidate within the time range; and where a customer has specified the appointment window and not specified an opening for the order, checking a list of openings for overlap with the appointment window;

generating a list of schedulable time blocks if there is no overlap, each of the schedulable time blocks in a list having at least one of a free time block and a virtual free time block and defining a range of time having openings to which the order can be assigned;

assigning the order to the schedule if there is an opening in the list of openings that overlaps with the appointment window or an opening in the list of schedulable time blocks that overlaps with the appointment window;

incrementing the time required to travel to the order and from the order to a next order, incrementing a booked time for the shift by an amount of time needed for traveling to the order and an amount of time needed to work on the order, and adjusting a load level of the shift to account for the order;

in response to having accurate travel time information, aggregating orders closely related for assignment to a same mobile service representative;

in response to not having accurate travel time information, aggregating orders in close proximity based on address information; and creating one or more usable free time blocks with greater duration to fit unassigned orders by defragmenting free time blocks.

2. The method of claim 1, further comprising committing the shift, which has been modified to fit the order, to a database.

* * * * *